United States Patent Office.

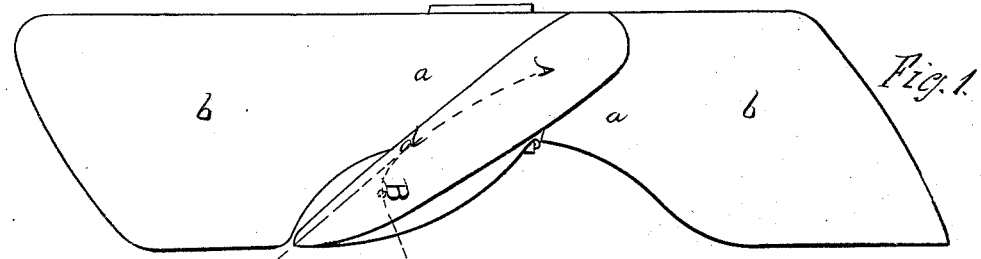

JOHN E. KENNEDY, OF NEW ORLEANS, LOUISIANA.

Letters Patent No. 77,888, dated May 12, 1868.

IMPROVEMENT IN SCREW-PROPELLERS.

The Schedule referred to in these Letters Patent and making part of the same.

TO ALL WHOM IT MAY CONCERN:

Be it known that I, JOHN E. KENNEDY, of the city of New Orleans, parish of Orleans, and State of Louisiana, have invented a certain new and useful Improvement in Screw-Propellers for steam-vessels; and I do hereby declare the following to be a full, clear, and exact description of the same, reference being had to the annexed drawings, making part of this specification, in which—

Figure 1 is an edge, and
Figure 2 a rear view thereof.

My invention is designed to keep a full pressure upon the blades or wings of the screw, in such manner as will best subserve the end of propelling the vessel, and thus to prevent all slip of the screw, or loss from the splashing or throwing up of the water, or, in other words, to concentrate or pack the water behind each blade of the screw, so that the same shall necessarily be driven, in the revolution of the screw, in an unbroken column, very nearly if not directly backwards, or reversely to the course of the vessel, and hence to make effective the whole power of the screw and engine in the propulsion of the vessel.

To do this, I adopt a novel formation of the blades, in respect to their rear and front surfaces or faces, which formation consists of two reverse curves, of dissimilar proportions, the outer or main propelling-curves representing arcs of a circle of greatly reduced diameter, in respect to or as compared with the inner and reversed curves, so that no appreciable slipping of water over the ends of the wings can possibly occur.

I am aware that Thomas Tripp obtained a patent on the 10th of April, 1866, for an improved screw-propeller, in which two reverse curves of specified relative proportions constitute the chief point of alleged merit, but my invention is wholly unlike his in principle and practice. In Tripp's screw, the outer curves of the blades coincide with the arc of the circumference of the entire screw, whilst the inner reverse curves coincide with an arc drawn upon a radius that is equal to one-half only of the radius of the said outer curves; whereas, in my screw, the outer curves are drawn upon a radius that is equal to one-fourth only of the radius of an arc of the circumference of the screw, or which coincides therewith, whilst the inner reverse curve is represented by the arc of a circle drawn upon a radius equal to three-fourths, at least, of the semi-diameter of the screw, and so presents a convexity that is only just sufficiently developed to allow the water, in the operation or revolution of the screw, to glide easily and smoothly over the surface of the same into the concavity of the outer curves, in which, in consequence of the reduced diameters of the same, it is necessarily packed and driven backwards very nearly at right angles to the plane in which the screw revolves.

It is an established truth in the science of physics that motion absorbs power, and in the fabrication of my improvement I have had regard to this law of nature, and also to the further demonstrated fact, that when the resistance to motion is a yielding resistance, such as water or any other fluid, a large percentum of power is lost, which would be saved if the resisting medium were a substantially immovable or fixed thing. Take for example, with the view of illustration, the effect in the case of the firing of a ball from a gun. The ball, having less resistance than the force evolved from the explosion of the powder, receives motion from that force, and is propelled through the air. Now, when the ball leaves the gun, it loses all connection with the resisting medium that gave it motion, and yet this motion has a value equivalent to the power expended in its creation, and if this motion can be made available for any purpose other than being expended in the flight of the ball through the air, there is manifestly a positive application of that value, whatever the nature of the application or the object sought to be obtained thereby. The principle involved in this supposed case is developed in my improved screw. I proceed, as briefly as I can, to show this.

In all propellers and all paddle-wheels, a very considerable portion of the power is expended in giving motion to the water. For our present purpose, it is of no sort of consequence what may be the value of that motion. The water, not being a fixed resistance, receives motion from the force of the paddle-wheels or wings of the screw, as the case may be, and that motion absorbs, to a considerable extent, the power of the engine that rotates the same. In the screw, the water is thrown from the centre towards the points of the blades, and if it (the water) passes over the points of the blades, and still has motion or force in it, the same is lost. My screw does not permit the water to pass over the points of the blades, and hence it utilizes the same, or, in other words, applies it to the propulsion of the vessel, for it will be seen, when this motion or current, rushing from the centre towards the circumference of the screw, strikes against the outer curves, near the points of the blades, the angle of reflection being directly opposite to the motion of the vessel, the resultant of the force so expended must necessarily be in the opposite direction, which is the direction of the vessel's motion.

But a reference to the drawings will demonstrate the foregoing proposition, and exhibit the exact nature of my invention more clearly than can be done with mere words.

$a$ marks the inner curves in the blades, and $b$ the outer curves; the first presenting their convex surfaces upon the rear or acting face of the screw, the latter their concave surfaces. The blades gradually widen as they extend out from the hub, until the centre or deepest part of the curve, $b$, is reached, and from this point they have parallel edges, or very nearly so, to their extremities, as shown clearly on the drawings. The obliquity of the blades with respect to the plane in which the screw rotates may be at any angle that experience has shown to be effective, and although the drawings exhibit but three blades, any number may obviously be used without in the slightest degree affecting the distinctive characteristics of my invention, which refers to the form of the blades, and not to their number.

I take now for example the action of a single jet or globule of water, for purposes of illustration, and supposing it to start from the point A, it will be driven to the point B along the line $f$, where it comes into contact obliquely against the curve $b$, just before reaching the end of the blade, and is reflected or deflected in the direction of the line B C. Did not this curve extend to the point or extremity of the wing, or if it were less sharply defined, and hence presented a shallower concavity, the jet of water, instead of being reflected in the direction of the line B C, would glide off in the direction of the dotted line $d\ e$, and the momentum it would have received in passing the point B would be entirely lost, whereas, in coming into contact with the curve, its motion is arrested, or, in other words, communicated to the screw, in precisely the amount of force required to arrest or change its line of motion. This motion is therefore absorbed and expended on the screw, and the resultant of the reflection thereof is very nearly, if not exactly, in the direction of the vessel's motion, which could not be the case if the water were to glide off the wings, or were reflected in any other direction than reversely to the line of the vessel's course. Hence it follows that my improvement not only changes or arrests the motion of the water, and holds it within the orbit of the extremities of the blades, but that it also, as a consequence thereof, obtains a better resultant of the force expended than can be done by any other screw heretofore devised.

Having thus described my invention, I wish it to be distinctly understood that I do not claim broadly the making of two reverse curves in the blades of a screw-propeller, nor the making of such reverse curves as are described and claimed by Thomas Tripp, in his patent of April 10, 1866; but

What I do claim, and desire to secure by Letters Patent, is—

Constructing the blades or wings of a screw-propeller with two reversed curves, when the outer curves shall be drawn upon a radius equal to one-fourth only of the radius of an arc of the circumference of the screw, and the inner curves upon a radius three times the length of the radius of the said outer curves, substantially as herein described, for the purpose set forth.

JOHN E. KENNEDY.

Witnesses:
DANIEL KENNEDY,
H. N. JENKINS.